US008140548B2

(12) United States Patent
Bruno et al.

(10) Patent No.: US 8,140,548 B2
(45) Date of Patent: Mar. 20, 2012

(54) CONSTRAINED PHYSICAL DESIGN TUNING

(75) Inventors: Nicolas Bruno, Redmond, WA (US);
Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 12/191,303

(22) Filed: Aug. 13, 2008

(65) Prior Publication Data
US 2010/0042963 A1 Feb. 18, 2010

(51) Int. Cl.
G06F 7/00 (2006.01)
G06F 17/30 (2006.01)

(52) U.S. Cl. ............ 707/756; 707/602; 707/713

(58) Field of Classification Search ............ None
See application file for complete search history.

(56) References Cited

U.S. PATENT DOCUMENTS

| | | | |
|---|---|---|---|
| 5,404,510 A | 4/1995 | Smith et al. | |
| 5,485,610 A | 1/1996 | Gioielli et al. | |
| 5,572,436 A * | 11/1996 | Dangelo et al. | 716/18 |
| 5,754,887 A * | 5/1998 | Damron et al. | 710/39 |
| 5,819,255 A * | 10/1998 | Celis et al. | 1/1 |
| 5,960,423 A | 9/1999 | Chaudhuri et al. | |
| 6,088,524 A | 7/2000 | Levy et al. | |
| 6,169,983 B1 | 1/2001 | Chaudhuri et al. | |
| 6,438,741 B1 * | 8/2002 | Al-omari et al. | 707/694 |
| 6,490,590 B1 | 12/2002 | Fink | |
| 6,516,310 B2 * | 2/2003 | Paulley | 1/1 |
| 6,598,038 B1 * | 7/2003 | Guay et al. | 1/1 |
| 6,622,221 B1 | 9/2003 | Zahavi | |
| 7,139,778 B2 | 11/2006 | Chaudhuri et al. | |
| 7,272,589 B1 | 9/2007 | Guay et al. | |
| 7,634,456 B2 * | 12/2009 | Yagoub et al. | 1/1 |
| 7,668,801 B1 * | 2/2010 | Koudas et al. | 707/999.002 |
| 7,805,411 B2 * | 9/2010 | Ziauddin et al. | 707/688 |
| 2003/0093408 A1 * | 5/2003 | Brown et al. | 707/2 |
| 2004/0002957 A1 * | 1/2004 | Chaudhuri et al. | 707/2 |
| 2005/0125427 A1 * | 6/2005 | Dageville et al. | 707/100 |
| 2005/0223026 A1 * | 10/2005 | Chaudhuri et al. | 707/103 R |
| 2007/0038595 A1 * | 2/2007 | Ghosh et al. | 707/2 |
| 2007/0192280 A1 * | 8/2007 | Agrawal et al. | 707/2 |
| 2007/0239744 A1 | 10/2007 | Bruno et al. | |
| 2008/0154844 A1 * | 6/2008 | Gao et al. | 707/2 |

(Continued)

OTHER PUBLICATIONS

Lohman, Grammar-like Functional Rules for Representing Query Optimization Alternatives, Jun. 1988, ACM, pp. 18-27.*

(Continued)

*Primary Examiner* — Kuen Lu
*Assistant Examiner* — Jessica N Le
(74) *Attorney, Agent, or Firm* — L. Alan Collins; Collins & Collins Intellectual, LLC

(57) ABSTRACT

Described is a constraint language and related technology by which complex constraints may be used in selecting configurations for use in physical database design tuning. The complex constraint (or constraints) is processed, e.g., in a search framework, to determine and output at least one configuration that meets the constraint, e.g., a best configuration found before a stopping condition is met. The search framework processes a current configuration into candidate configurations, including by searching for candidate configurations from a current configuration based upon a complex constraint, iteratively evaluating a search space until a stopping condition is satisfied, using transformation rules to generate new candidate configurations, and selecting a best candidate configuration. Transformation rules and pruning rules are applied to efficiently perform the search. Constraints may be specified as assertions that need to be satisfied, or as soft assertions that come close to satisfying the constraint.

20 Claims, 5 Drawing Sheets

U.S. PATENT DOCUMENTS

| | | | |
|---|---|---|---|
| 2009/0070300 A1* | 3/2009 | Bartels et al. | 707/3 |
| 2009/0077016 A1* | 3/2009 | Belknap et al. | 707/2 |
| 2009/0100004 A1* | 4/2009 | Andrei et al. | 707/2 |
| 2009/0106321 A1* | 4/2009 | Das et al. | 707/200 |
| 2009/0276395 A1* | 11/2009 | Weissman et al. | 707/2 |
| 2009/0313213 A1* | 12/2009 | Milby | 707/2 |

OTHER PUBLICATIONS

Cao et al., Optimizing Complex Queries with Multiple Relation Instances, Jun. 2008, ACM, pp. 525-538.*

Agrawal et al., Automatic Physical Design Tuning: Workload as a Sequence, Jun. 2006, ACM, pp. 683-694.*

Monteiro, et al., "Automated Selection of Materialized Views", retrieved at <<ftp://ftp.inf.puc-rio.br/pub/docs/techreports/06_19_monteiro.pdf>>, pp. 14.

Choenni, et al., "A Framework for a Tool for Physical Database Design", 1995, pp. 12.

Rozen, et al., "A Framework for Automating Physical Database Design", Proceedings of the 17th International Conference, Sep. 1991, pp. 401-411.

"TPC Benchmark H"Transaction Processing Performance Council, 1993-2008, pp. 148.

Agrawal, et al., "Automated Selection of Materialized Views and Indexes for SQL Databases", Proceedings of the 26th International Conference, 2000, pp. 496-505.

Agrawal, et al., "Database Tuning Advisor for Microsoft SQL Server 2005", Proceedings of the 30th VLDB Conference, 2004, pp. 1110-1121.

Bruno, et al., "Physical Design Refinement: The 'Merge-Reduce' Approach", ACM Transactions on Database Systems (TODS, 2007, vol. 32, Issue 4, pp. 18.

Bruno, et al., "Automatic Physical Database Tuning: A Relaxation-based Approach", ACM, 2005, pp. 227-238.

Bruno, et al., "To Tune or Not to Tune? A Lightweight Physical Design Alerter"ACM, 2006, pp. 12.

Bruno, et al., "Configuration-Parametric Query Optimization for Physical Design Tuning", ACM, 2008, pp. 12.

Chaudhuri, et al., "An Efficient Cost-Driven Index Selection Tool for Microsoft SQL Server", Proceedings of the 23rd VLDB Conference, 1997, pp. 146-155.

Chaudhuri, et al., "AutoAdmin 'What-if' Index Analysis Utility", ACM SIGMOD Record, 1998, pp. 12.

Chaudhuri, et al., "Index Merging",15th International Conference on Data Engineering (ICDE'99), 1999, pp. 8.

Conn, et al., "Large-Scale Nonlinear Constrained Optimization: A Current Survey", retrieved at <<http://citeseer.ist.psu.edu/cache/papers/cs/12818/ftp:zSzzSzftp.numerical.rl.ac.ukzSzpubzSzreportszSzcgtCERFACS9403.pdf/conn94largescale.pdf>>; Feb. 1, 1994, pp. 38.

Dageville, et al., "Automatic SQL Tuning in Oracle 10g", Proceedings of the 30th VLDB Conference, 2004, pp. 1098-1108.

"Deadlock Troubleshooting, Part 3", <<http://blogs.msdn.com/bartd/archive/2006/09/25/deadlock-troubleshooting-part-3.aspx>>, pp. 30.

Fonseca, et al., "Genetic Algorithms for Multi-Objective Optimization : Formulation, discussion and generalization", retrieved at <<http://w3.ualg.pt/~cmfonsec/pubs/fonseca-ga93-reprint.pdf>>, pp. 8.

Papadomanolakis, et al., "An Integer Linear Programming Approach to Database Design", IEEE, 2007, pp. 442-449.

Surry, et al., "A Multi-objective Approach to Constrained Optimisation of Gas Supply Networks: The COMOGA Method", AISB Workshop on Evolutionary Computing, 1995, pp. 15.

Valentin, et al., "DB2 Advisor: An Optimizer Smart Enough to Recommend Its Own Indexes",Data Engineering, 2000, pp. 10.

Zilio, et al., "DB2 Design Advisor: Integrated Automatic Physical Database Design", Proceedings of the 30th VLDB Conference, 2004, pp. 1087-1097.

Zilio, et al., "Recommending Materialized Views and Indexes with the IBM DB2 design advisor", Proceedings of the International Conference on Autonomic Computing, 2004, pp. 9.

* cited by examiner

CONSTRAINED PHYSICAL DESIGN TUNING

BACKGROUND

The performance of database systems, particularly enterprise database systems, depends on an effective configuration of physical design structures, such as indexes, in the databases that compose those systems. Automatically configuring such physical design structures to increase the performance of the underlying database system, generally referred to as an automated physical design problem, has been recently researched.

The physical design problem statement is traditionally stated as:

Given a workload W and a storage budget B, find the set of physical structures (that is, the configuration) that fits within B and results in the lowest execution cost for W.

Thus, existing solutions to the automated physical design problem generally attempt to minimize execution costs of input workloads for a given a storage constraint. However, this model is not flexible enough to address several real-world situations. More particularly, a single storage constraint does not model many important situations in current database management system installations. What is needed is a generalized version of the physical design problem statement that accepts one or more complex constraints.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a constraint language is provided to allow specifying one or more complex constraints for use in selecting configurations for use in physical database design tuning. The complex constraint (or constraints) are processed, e.g., in a search framework, to determine and output at least one configuration that meets the constraint for use in physical design tuning, e.g., a best configuration found before a stopping condition is met.

In one example implementation, a constraint language is provided, including grammar for asserting a function with respect to a value. For example, a new execution cost may be specified relative to an original execution cost of executing a workload. Also provided is a mechanism for the soft assertion of a function with respect to a value.

In one example implementation, a search framework processes a current configuration into candidate configurations, including by searching for candidate configurations from a current configuration based upon a complex constraint, iteratively evaluating a search space until a stopping condition is satisfied, using transformation rules to generate new candidate configurations, and selecting a best candidate configuration. Transformation rules and pruning rules are applied to efficiently perform the search.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards adding constraints, including more than a storage constraint, to provide solutions to the physical design problem. As will be understood, in part this is facilitated by a constraint language that is straightforward to use, yet is sufficiently powerful to express various scenarios. Further described is a search framework to incorporate such constraints into a transformation-based search strategy.

While some of the examples described herein are directed towards an example constraint language and technology that builds upon an existing transformation-based framework to effectively incorporate constraints in the search space, it is understood that these are only examples. Alternative languages and or frameworks may be implemented. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
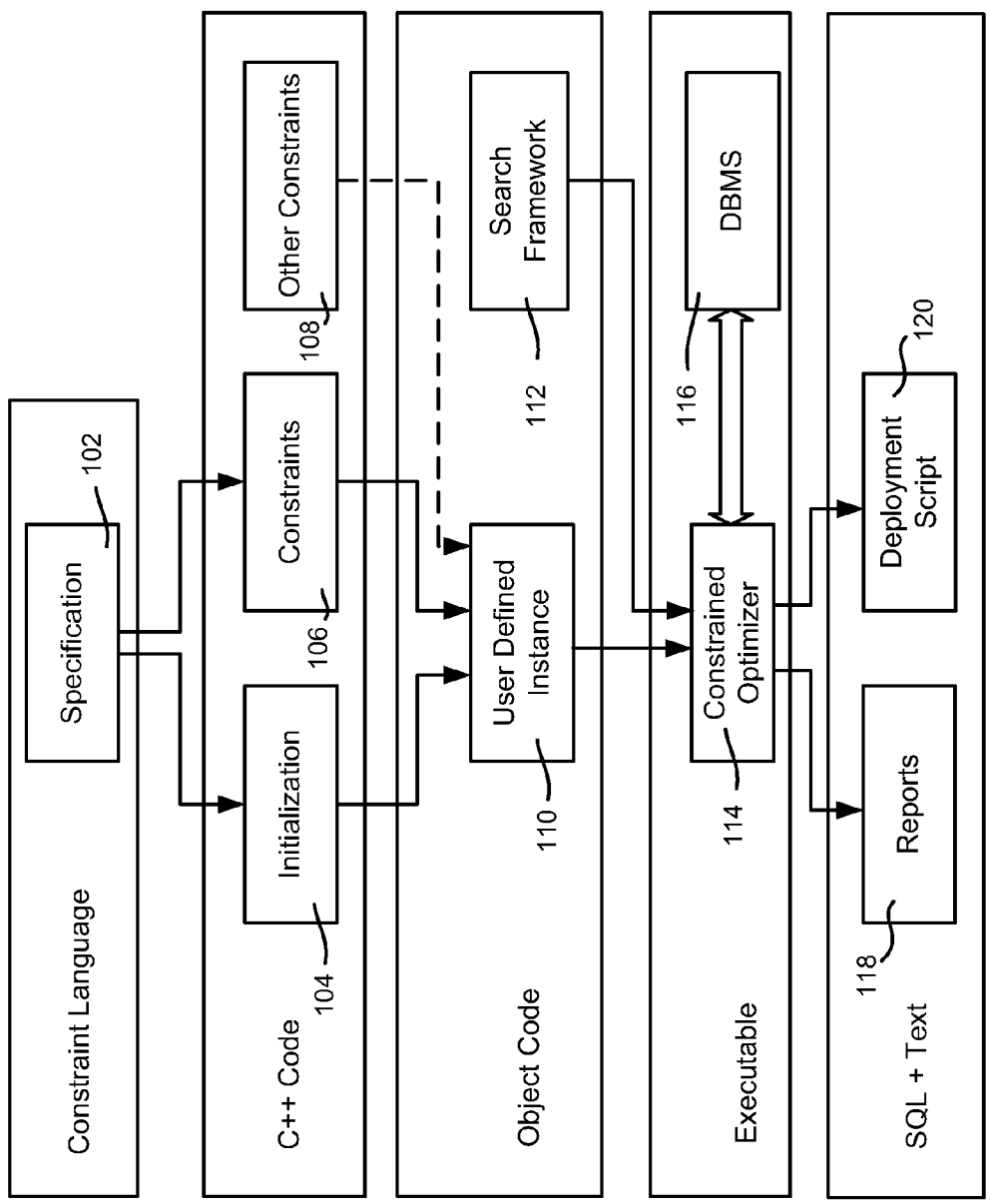
FIG. 1 is a block diagram representing components and steps related to constrained physical device tuning.

Turning to FIG. 1, there is shown a general block diagram representing starting with a problem specification and processing into results. In general, a user (designer, administrator or the like) provides a specification 102 using the constraint language described below, from which C++ code (in one example implementation) is produced. Initialization code 104 and constraints 106 are produced; the user (e.g., via custom code and/or a library) may also specify other constraints 108, as described below.

The C++ code produces a user-defined object code instance 110, e.g., via compilation. In association with a search framework 112 (described below with respect to FIG. 2), a constrained optimizer 114 uses the user-defined instance 110 to generate results for a database management system 116. The results include a deployment script 118 (e.g., in SQL), possibly along with text reports 120 or the like.

Turning to aspects of the constraint language, as a simple example, consider the following query:

```
SELECT a, b, c, d, e
FROM R
WHERE a=10
```

Further, suppose that a single tuple from R satisfies a=10. If the space budget allows it, a covering index $I_C$ over (a, b, c, d, e) is the best alternative for q, requiring a single I/O to locate the qualifying row and the required columns. However, consider further a narrow single-column index $I_N$ over (a). In this case, two I/Os are needed to respond to the query; one to locate the record-id of the qualifying tuple from the secondary index $I_N$, and another to fetch the relevant tuple from the primary index.

In absolute terms, $I_C$ results in a better execution plan compared to that of $I_N$. However, the execution plan that uses $I_N$ is only slightly less efficient to the one that uses $I_C$ (specially compared to the naïve alternative that performs a sequential scan over table R), and at the same time incurs no overhead for updates on columns b, c, d, or e. If such updates are possible, it may make sense to "penalize" wide indexes such as $I_C$ from appearing in the final configuration. However, current techniques cannot explicitly model this requirement without resorting to artificial changes. For instance, this behavior may be simulated by introducing artificial UPDATE statements in the workload. This mechanism, however, is not general enough to capture other important scenarios described below. Note, however, that there are situations for which the covering index is the superior alternative (e.g., there could be no updates on table R by design). Indeed, an application that repeatedly and almost exclusively executes the above query can result in a fifty percent improvement when using the covering index $I_C$ rather than the narrow alternative $I_N$. Deadlocks also may result when narrow indexes are used.

In general, there are other situations in which the traditional problem statement for physical design tuning is not sufficient. In many cases there is additional information that may be incorporated into the tuning process. It is often not possible to do so by only manipulating either the input workload or the storage constraint. For instance, it may be desired to tune a given workload for maximum performance under a storage constraint, while ensuring that no query degrades by more than ten percent with respect to the original configuration. Alternatively, it may be specified to enforce that the clustered index on a table T cannot be defined over certain columns of T that would introduce "hot-spots" (without specifying which of the remaining columns are to be chosen). As yet another example, in order to decrease contention during query processing, a tuning solution may want to prevent having any single column from a table appear in more than some number of indexes (e.g., three), as the more indexes in which a column appear, the more that contention is likely due to exclusive locks during updates. As can be readily appreciated, tuning based upon a single storage constraint does not handle these and other such situations in current DBMS installations.

Described herein is technology directed towards a generalized version of the physical design problem statement that accepts one or more complex constraints (that is, not simply a storage budget constraint) in the solution space, and provides expressiveness, so that it is straightforward to specify constraints with sufficient expressive power. Further, the technology facilitates effectiveness, in that constraints are able to effectively restrict the search process. Still further, specialization is provided, e.g., when there is a single storage constraint, the resulting configurations are close, in terms of quality, to those obtained by current physical design tools. The technology described herein addresses expressiveness, effectiveness and specialization. For simplicity herein, described are techniques to handle secondary indexes as the physical structures that define the search space, (although other structures such as corresponding to primary indexes, materialized views and other physical structures may similarly be used).

One example design provides a simple constraint language that covers various scenarios, along with a lower-level interface to specify more elaborate constraints as well as efficient ways to evaluate constraints. By way of examples of data types, functions and constants, the exemplified constraint language understands simple types such as numbers and strings, and also domain-specific ones. More particularly, data types that are relevant for physical design, such as database tables, columns, indexes and queries are natively handled. Sets of elements, comprising unordered homogeneous collections (e.g., workloads are sets of queries, and configurations are sets of indexes) are also supported. These sets may be accessed using either positional or associative array notation (e.g., W[2] returns the second query in W, and W["QLong"] returns the query in W whose identifier is QLong).

The language supports a rich set of functions over these data types. By way of example, the columns of a table T are obtained using cols(T), the expected size of an index I using size(I), and the expected cost of query q under configuration C using cost(q, C). Additional functions are described herein.

Further, other useful constants are referenced in the language. For example, W is used to denote the input workload, with the following constants to specify certain commonly used configurations:

C: denotes a desired configuration, for which constraints are typically specified.

COrig: The configuration that is currently deployed in the database system.

CBase: The base configuration only contains those indexes originating from integrity constraints. Therefore, it is the worst possible configuration for SELECT queries in the workload, and the one with lowest UPDATE overhead.

CSelectBest: This configuration is the best possible one for SELECT queries in the workload; CSelectBest contains the indexes resulting from access-path requests generated while optimizing the input workload. Intuitively, indexes in this configuration are the most specific ones that can be used in some execution plan for a query in the workload. For instance, the two indexes in CSelectBest for a query:

```
SELECT a,b,c FROM R
WHERE a<10
ORDER BY b
``` are (a,b,c), from the access-path request that attempts to seek column a for the tuples that satisfy a<10 followed by a sort by b, and (b,a,c), from the access-path-request that scans R in b-order and dynamically filters a<10.

The following examples show various features of one exemplified constraint language. In this exemplified language, constraints start with the keyword ASSERT and follow a "function-comparison-constant" pattern. For example, the language allows for specifying the storage constraint (used in virtually all contemporary physical design tuning tools) as follows:

$$\text{ASSERT size}(C) \leq 200M$$

where size(C) returns the combined size of the final configuration.

As another example, the cost-related constraint below ensures that the cost of the second query in the workload under the final configuration is not worse than twice its cost under the currently deployed configuration:

ASSERT cost(W[2], C)≦2*cost(W[2], COrig)

Note that for a fixed query Q, the value cost(Q, COrig) is constant, so the ASSERT clause above is valid.

As another aspect, generators allow applying a template constraint over each element in a given collection. For instance, the following constraint generalizes the previous one by ensuring that the cost of each query under the final configuration is not worse than twice its cost under the currently deployed configuration:

FOR Q IN W ASSERT cost(Q, C)≦2*cost(Q, COrig)

In turn, the following constraint ensures that every index in the final configuration has at most four columns:

FOR I in C ASSERT numCols(I)≦4

Filters allow choosing a subset of a generator. For instance, to enforce the above constraint only for indexes that have leading column col3, the original constraint may be extended as follows:

```
FOR I in C
  WHERE I LIKE "col3,*"
  ASSERT numCols(I) ≦ 4
``` where LIKE performs "pattern matching" on the index columns.

With respect to aggregation, generators allow duplicating a constraint multiple times by replacing a free variable in the ASSERT clause with a range of values given by the generator. In many situations, it is desired to have a constraint act on an aggregate value calculated over the elements in a generator. As a simple example, the original storage constraint used in physical design tools using generators and aggregates may be rewritten as follows:

```
FOR I in C
  ASSERT sum(size(I)) ≦ 200M
```

As a more complex example, the following constraint ensures that the combined size of all indexes defined over table T is not larger than four times the size of the table itself:

```
FOR I in C
  WHERE table(I) = TABLES["T"]
  ASSERT sum(size(I)) ≦ 4 * size(TABLES["T"])
``` where TABLES is the collection of all the tables in the database, and function size on a table returns the size of its primary index.

With respect to nested constraints, in one example implementation, constraints may have free variables that are bound by outer generators, effectively resulting in nested constraints. The net effect of the outer generator is to duplicate the inner constraint by binding each generated value to the free variable in the inner constraint. As an example, the following constraint generalizes the previous one to iterate over all tables:

```
FOR T in TABLES
  FOR I in C
    WHERE table(I) = T
    ASSERT sum(size(I)) ≦ 4 * size(T)
```

The implicit meaning of the language defined thus far is that a configuration has to satisfy all constraints to be valid. Among those valid configurations, the one with the minimum expected cost is kept for the input workload. There are situations, however, in which a relaxed notion of constraint is useful. For instance, consider a constraint that enforces that every non-UPDATE query results in at least ten percent improvement over the currently deployed configuration. In general, there may not be a configuration that satisfies this constraint, particularly in conjunction with a storage constraint.

In such situations, the language provides an alternative for specifying a soft constraint, which in this example states that the final configuration is to get as close as possible to a ten percent improvement (a configuration with, say, eight percent improvement is still considered valid). To specify such soft constraints, a SOFT keyword is added in the ASSERT clause. The resulting constraint thus becomes:

```
FOR Q in W
  WHERE type(Q) = SELECT
  SOFT ASSERT cost(Q, C) ≦ cost(Q, COrig) / 1.1
```

Note that a traditional optimization function (i.e., minimizing the cost of the input workload), may be then specified as follows:

```
FOR Q IN W
  SOFT ASSERT sum(cost(Q, C)) = 0
```

If no soft constraints are present in a problem specification, the above soft constraint is implicitly added to therefore optimize for the expected cost of the input workload. In general, however, soft constraints allow significantly more flexibility while specifying a physical design problem. For instance, suppose that a solution corresponds to finding the smallest configuration for which the cost of the workload is at most twenty percent worse than that for the currently deployed configuration (this problem statement may be useful to eliminate redundant indexes without significantly degrading the expected cost of the workload). Using soft constraints, this scenario may be specified as follows:

```
FOR Q IN W
  ASSERT sum(cost(Q, C)) ≦ 1.2 * sum(cost(Q, COrig))
  SOFT ASSERT size(C) = 0
```

In general, to summarize the examples, in one exemplified language a constraint is defined by the grammar set forth below, where bold tokens are non-terminals (and self-explanatory), non-bold tokens are literals, tokens between brackets are optional and "|" represents choice:

```
constraint:=[SOFT] ASSERT [agg] function (≦|=|≧) constant
    | FOR var IN generator
        [WHERE predicate]
        constraint
```

As can be seen, even though the above-exemplified language is straightforward to use, it is able to specify the various examples described above. Further, as described below, constraints that lie outside the expressive power of the language may be handled by using a specialized interface.

By way of additional examples, constraints for the various examples set forth above are provided. As with one previous example, to ensure that no column appears in more than three indexes (to decrease the chance of contention), the following constraint may be used:

```
FOR T in TABLES
    FOR col in cols(T)
        FOR I in C WHERE I LIKE "*,col,*"
            ASSERT count(I) ≦ 3
```

As another example, the following constraint enforces that the clustered index on table T has either a, b, or c as its leading column:

```
FOR I in C
    WHERE clustered(I)
    ASSERT I LIKE "(a,*)|(b,*)|(c,*)"
```

Note that the above ASSERT clause is a predicate and does not follow the pattern "function-comparison-constant" described above. A predicate p is thus implicitly replaced with $\delta$ (p)=1, where $\delta$ is the characteristic function ($\delta$(true)=1 and $\delta$(false)=0).

Continuing with solutions to the above examples, the constraint below enforces that no SELECT query degrades by more than ten percent compared to the currently deployed configuration:

```
FOR Q in W
    WHERE type(Q) = SELECT
    ASSERT cost(Q, C) ≦ 1.1 * cost(Q, COrig)
```

The next example constraint enforces that no index can be replaced by its narrow version without at least doubling the cost of some query:

```
FOR I in C
    FOR Q in W
        ASSERT cost(Q, C − I + narrow(I))/cost(Q, C) ≦ 2
``` where narrow(I) results in a single-column index with I's leading column (e.g., narrow((a,b,c))=(a)).

Figure 2:
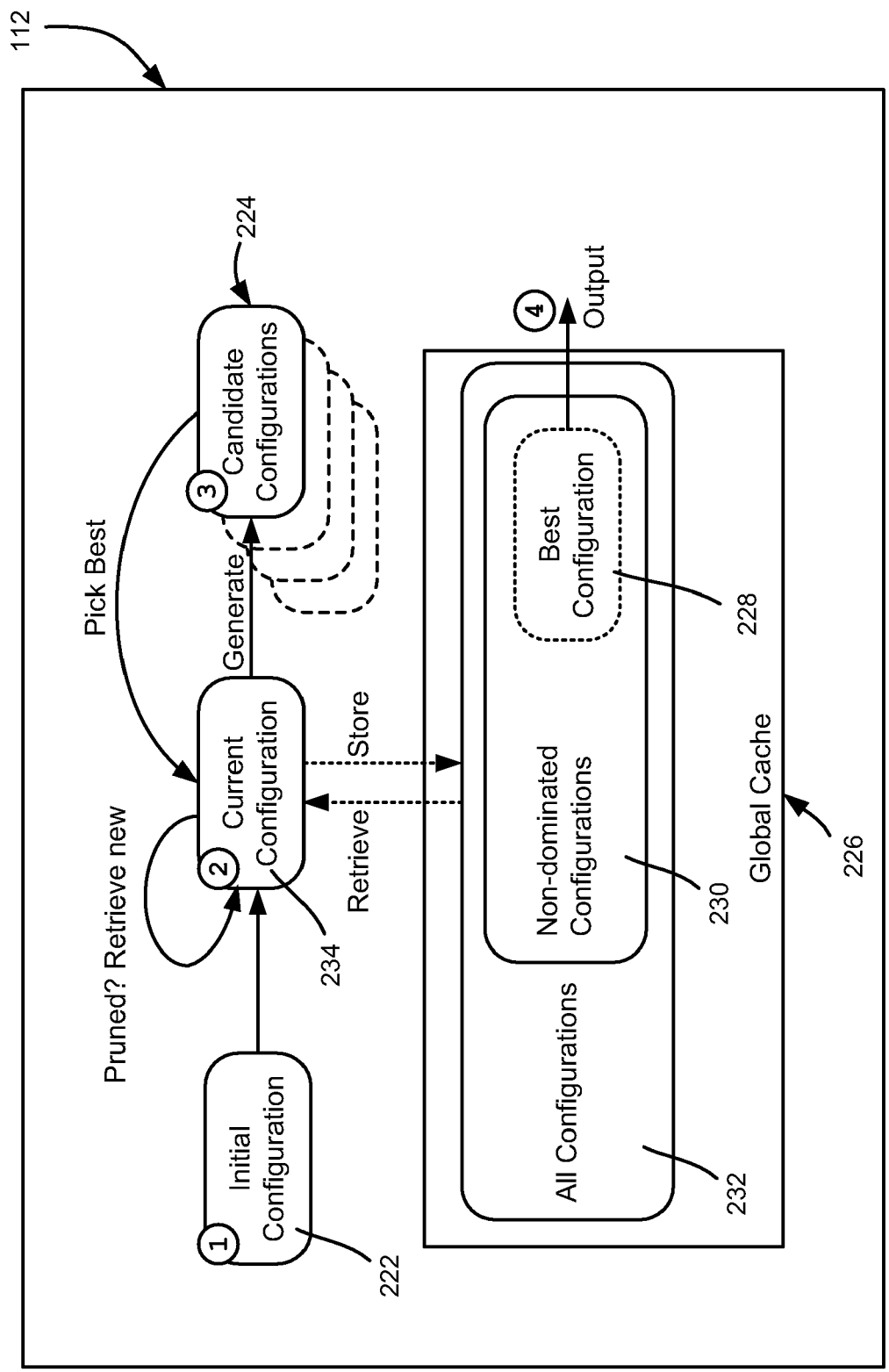
FIG. 2 is a block diagram showing a search framework used for locating one or more configurations in physical device tuning.

Turning to FIG. 2 and an explanation of a general architecture of one example search framework 112 for finding the best configuration (or configurations) subject to the constraint or constraints, for purposes of explanation the traditional physical design problem (i.e., a single storage constraint with optimization performed for expected cost) is generally described, with multiple constraints thereafter incorporated into the search framework 112. As will be understood, with respect to a high-level search strategy, the framework 112 starts with some configuration 222 (e.g., an initial one or a previously explored one), and keeps transforming it into more and more promising candidates 224 until a pruning condition is satisfied. At this point the search framework 112 picks a new configuration and begins a new iteration.

FIG. 2 shows an architectural overview of an example search framework 112, including a global cache 226 of explored configurations. In the example framework 112, the global cache 226 is structured in three tiers, which respectively contain the best configuration 228 found so far, the set of non-dominated configurations 230 (in case there are multiple soft constraints; a dominating configuration is described below), and any remaining suboptimal configurations 232. The search begins from the initial configuration 222 (represented by the circled numeral one (1)), which becomes the current configuration 234. Thereafter, the search space is progressively explored until a stopping condition, such as a time bound, is satisfied.

Each exploration iteration includes evaluating the current configuration 234 and storing it in the global cache, (circled numeral two (2)). Then, a pruning check on the current configuration 234 is performed. If the check decides to prune the current configuration, the framework 112 keeps retrieving previously explored configurations from the global cache 226 until one is obtained that is not pruned; this step effectively implements a backtracking mechanism. At this point, transformation rules are used to generate the new candidate configurations 224 from the current one 234 (circled numeral three (3)). Candidate configurations 224 are ranked based on their expected promise, with the best candidate configuration that is not already in the global cache selected, which becomes the next current configuration 234, and so on.

This cycle repeats until some stopping criterion is met, at which time the best configuration (or configurations) 228 found thus far may be output (circled numeral four (4)).

Each step (circled numerals one through four) in the search process requires evaluating a previously unexplored configuration, which in itself includes two tasks. One task determines whether the storage constraint is satisfied, and if not, how close the current configuration is to a viable state. With a storage constraint of B, the size of the current configuration, size(C) is estimated. If size(C)≦B, the storage constraint is satisfied. Otherwise, the value size(C)−B quantifies the closeness to a valid configuration.

A second task evaluates the optimizing function, that is, the expected cost of the workload under the current configuration. In order to do so, the queries in the workload are optimized in a "what-if" mode, which returns the expected cost of each query without materializing the configuration. This task step is usually a bottleneck, because optimizer calls are typically expensive. There are various ways to reduce this overhead. One approach is to use information about previous optimizations to infer, in some cases, the cost of a query under a given configuration without issuing an optimization call (examples of such techniques use atomic configurations or a top-down relaxation approach). A recent approach (N. Bruno and R. Nehme, "Configuration-parametric query optimization for physical design tuning, In Proceedings of the ACM International Conference on Management of Data (SIGMOD), 2008) results in accurate approximations of the cost of a query at very low overhead (typically orders of magnitude faster than a regular optimization call).

After evaluating the current configuration, transformation rules are applied to generate a set of new, unexplored configurations in the search space. For that purpose, a merge-reduce family of transformations described herein is used. More particularly, the transformations that are considered for the current configuration may include:

Merging rules: Merging may eliminate redundancy in a configuration without losing significant efficiency during query processing. The (ordered) merging of two indexes $I_1$ and $I_2$ defined over the same table is the best index that can answer the requests that $I_1$ and $I_2$ do, and can efficiently seek in the cases that $I_1$ can. Specifically, the merging of $I_1$ and $I_2$ is a new index that contains all the columns of $I_1$ followed by those in $I_2$ that are not in $I_1$ (if one of the original indexes is a clustered index, the merged index will also be clustered). For example, merging (a, b, c) and (a, d, c) returns (a, b, c, d). Index merging is an asymmetric operation (i.e., in general merge($I_1$, $I_2$)≠merge($I_2$, $I_1$)). Let C be a configuration and ($I_1$, $I_2$) a pair of indexes defined over the same table such that $\{I_1, I_2\} \subseteq C$. Then, the merging rule induced by $I_1$ and $I_2$ (in that order) on C, denoted merge(C, $I_1$, $I_2$) results in a new configuration C'=C−$\{I_1, I_2\} \cup$ {merge ($I_1$, $I_2$)}.

Reduction rules: Reduction rules replace an index with another that shares a prefix of the original index columns. For instance, the reductions of index (a, b, c, d) are (a), (a, b), and (a, b, c). A reduction rule denoted as reduce(C, I, k), where k is the number of columns to keep in I, replaces I in C with its reduced version reduce(I, k).

Deletion rules: Deletion rules, denoted remove(C, I), remove index I from configuration C. If the removed index is a clustered index, it is replaced by the corresponding table heap.

The number of transformations for a given configuration C is O(n·(n+m)) where n is the number of indexes in C and m is the maximum number of columns in an index in C. In real situations this number is likely to be much smaller, because indexes are spread throughout several tables (and therefore merging is valid for only a subset of the possible cases), and also because not all reductions need to be considered. For example, consider index I on (a, b, c, d, e) and the single-query workload:

| SELECT a,b,c,d,e |
| FROM R |
| WHERE a=10 |

In this situation, the only useful reduction for the index is I' on (a), since any other prefix of I is going to be both larger than I' and less efficient for answering the query.

Figure 3:
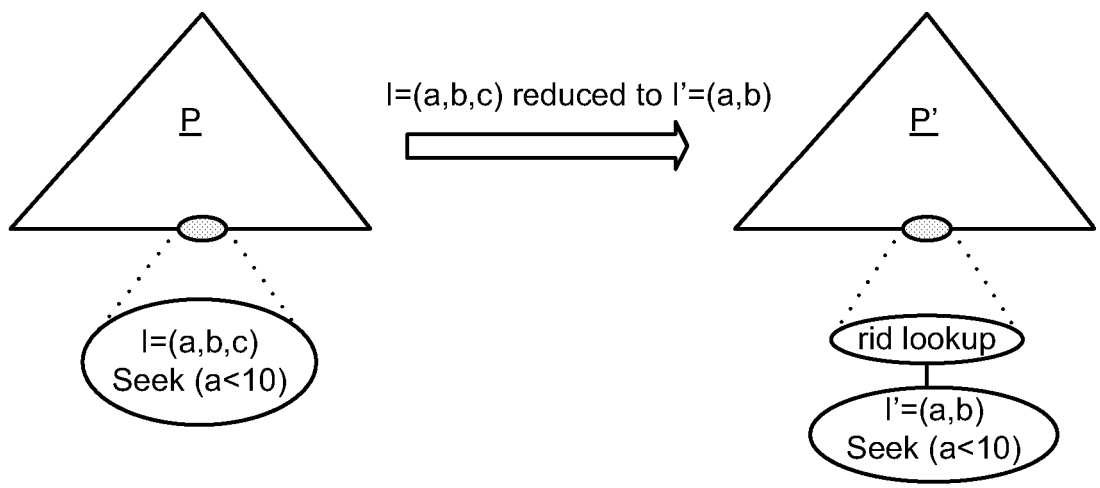
FIG. 3 is a representation of performing local transformations to obtain upper-bound costs.

After generating the valid transformations for the current configuration, they are ranked in decreasing order of "promise," so that more promising configurations are chosen and explored first. For that purpose, the expected cost of the workload and the expected size (i.e., the storage constraint) of each resulting configuration are estimated. While estimating sizes can be done efficiently, estimating workload costs is more challenging. One reason is that there are often several candidate configurations to rank (typically one per transformation), and the cost of optimizing queries (even using the optimizations described earlier) is too costly. To address this issue, a known local transformation approach is used, obtaining upper bounds on the cost of queries for each candidate transformation. Consider a query q and a configuration C' obtained from C. a general idea is to analyze the execution plan of q under C and replace each sub-plan that uses an index in C-C' with an equivalent plan that uses indexes in C' only. As an example, consider the execution plan P at the left of FIG. 3 under configuration C. Index I on (a, b, c) is used to seek tuples that satisfy a<10 and also to retrieve additional columns b and c, which would eventually be needed at higher levels in the execution plan. Consider evaluating a configuration C' obtained by reducing I to I' on (a, b); the small portion of the execution plan that uses I may be replaced with a small compensating plan that uses I' (specifically, the replacement sub-plan uses I' and additional rid-lookups to obtain the remaining required c column). The resulting plan P' is therefore valid and at most as efficient as the best plan found by the optimizer under C'.

Once estimates are obtained for the optimizing function and the deviation from the storage constraint for each of the alternative configurations, these values are put together to rank the different candidate transformations. In the context of a single storage constraint, one known technique uses the value $\Delta_{cost}/\Delta_{size}$ to rank transformations, where $\Delta_{cost}$ is the difference in cost between the pre- and post-transformation configuration, and $\Delta_{size}$ is the respective difference in required storage As described above, the framework continues transforming the current configuration until it is pruned, at which point it backtracks to a previous configuration and starts another iteration. Consider a single storage constraint B, and assume a SELECT-only workload. Suppose that the current configuration C exceeds B, but after transforming C into C' it is observed that C' is within the storage bound B. In this case, no matter how C' is further transformed, it never obtains a valid configuration that is more efficient than C'. The reason is that all the transformations (i.e., merges, reductions and deletions) result in configurations that are less efficient for the input workload. Therefore, C' dominates the remaining unexplored configurations, and the current iteration may be stopped by pruning C'. When there are multiple rich constraints, the pruning condition becomes more complex, as described below.

Although any configuration can be chosen to be the starting point in a search, the initial configuration effectively restricts the search space. Specifically, the search framework is able to eventually consider any configuration that is a subset of the closure of the initial configuration under the set of transformations. Formally, let C be a configuration and let $C_i (i \geq 0)$ be defined as follows:

$$C_0 = C$$

$$C_{i+1} = C_i \cup \{\text{merge}(I_1, I_2) \text{ for each } I_1, I_2 \in C_i\} \cup$$

$$\{\text{reduce}(I, K) \text{ for each } I \in C_i, K < |I|\}$$

Closure is defined as closure(C)=$C_k$, where k is the smallest integer that satisfies $C_k$=$C_{k+1}$. The closure of a configuration C is then the set of all indexes that are either in C or can be derived from C through a series of merging and reduction operations. For that reason, if no subset of the closure of the initial configuration satisfies all the constraints, the problem is unfeasible. Unless a specific initial configuration is given, the default starting point is CSelectBest, which contains the most specific indexes that can be used anywhere by the query optimizer for the input workload, and thus may be appropriate to handle all but non-standard constraints (e.g., a requirement that some index not useful for any workload query be present in the final configuration).

To integrate constraints into the search framework, constraints are converted into objective functions, avoiding directly comparing multiple objectives together by using Pareto optimality concepts.

Constrained physical design is a multi-constraint multi-objective optimization problem (note that soft-constraints naturally lead to more than a single optimization function). A common approach to handle such problems is to transform constraints into new objective functions (called c-objectives for short) and then solve a multi-objective optimization problem. Note that the function-comparison-constant pattern for ASSERT clauses enables assigning a non-negative real value to each constraint with respect to a given configuration. It is in fact straightforward to create a c-objective that returns zero if the constraint is satisfied and positive values when it is not (and moreover, the higher the value the more distant the configuration to one that satisfies the constraint). The following table shows this mapping for converting constraints into c-objectives, where F(C) and K denote, respectively, the function (of the current configuration) and the constant in the ASSERT clause:

| Constraint | Objective |
| --- | --- |
| $F(C) \leq K$ | $\max(0, F(C) - K)$ |
| $F(C) = K$ | $|F(C) - K|$ |
| $F(C) \geq K$ | $\max(0, K - F(C))$ |

For constraints that iterate over multiple ASSERT clauses, the values of the individual ASSERT clauses are summed; (note that alternatively, each ASSERT within a generator may be considered individually, but this tends to result in additional complexities without improving the effectiveness of the search strategy).

Each configuration is thus associated with $n_s+n_h$ values for $n_s$ soft constraints and $n_h$ hard (i.e., non-soft) constraints. Minimizing the $n_h$ c-objectives down to zero results in a valid configuration that satisfies the hard constraints, while minimizing the ns c-objectives results in the most attractive configuration (which might not satisfy some hard constraint). Usually, the $n_h$ c-objectives are in opposition to the $n_s$ c-objectives and also to each other, and therefore the search problem is not straightforward. A common approach to address multi-objective problems is to combine all c-objectives together into a new single objective function. In this way, the resulting optimization function may become:

$$singleObjective(C) = \sum_{i=1}^{n} w_i \cdot \alpha_i(C)$$

where $\alpha_i(C)$ denotes the i-th c-objective and $\omega_i$ are user-defined weights. While this approach is universally applicable, it suffers from a series of problems. The choice of weights is typically a subtle matter, and the quality of the solution obtained (or even the likelihood of finding a solution whatsoever) is often sensitive to the values chosen. A deeper problem arises from the fact that usually c-objectives are non-commensurate, and therefore trade-offs between them range from arbitrary to meaningless. For this reason, the original problem is not reduced to a single optimization alternative. Instead, the concept of Pareto optimality is used, which in general does not search for a single solution but instead the set of solutions with the "best possible tradeoffs".

The concept of Pareto optimality may be explained by using the notion of dominance, that is, vector $x=(x_1, \ldots, x_n)$ dominates vector $y=(y_1, \ldots, y_n)$ if the value of each dimension of x is at least as good as that of y, and strictly better for at least one dimension. Therefore, assuming that smaller values are better:

x dominates y $\Longleftrightarrow \forall i: x_i \leq y_i \wedge \exists j: x_j < y_j$ An element $x \in X$ is said to be Pareto Optimal in x if it is not dominated by any other vector $y \in X$; (the Pareto Optimal elements of a set are also said to form the skyline of the set). In one example scenario, each configuration is associated with a vector of size $n_s+n_h$ for $n_s$ soft constraints and $n_h$ hard constraints, and thus dominance of configurations may apply. If there is a single soft constraint and all hard constraints are satisfiable, there is a unique Pareto optimal solution. In fact, for a configuration to be valid, each of the $n_h$ c-objectives is zero, and thus the valid configuration with the smallest c-objective value for the soft-constraint dominates every other configuration. (Even for a single soft constraint, however, there can be multiple Pareto optimal configurations among the explored ones during the search.)

Figure 4A:
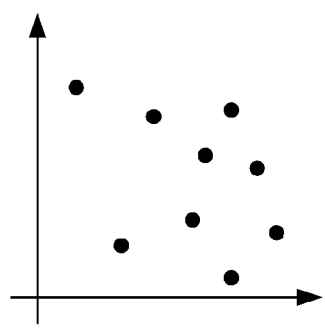
FIGS. 4A-4D are representations of inducing a partial order from dominance relationships among configurations.
Figure 4B:
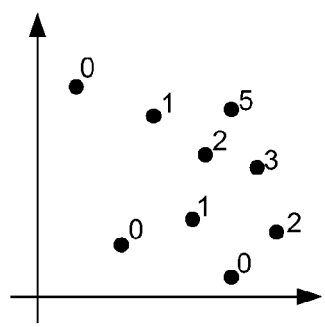
Figure 4C:
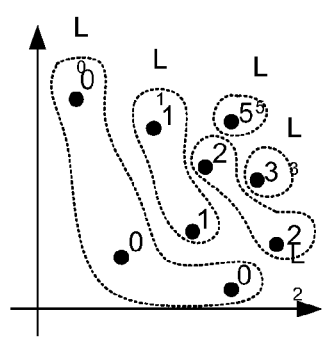
Figure 4D:
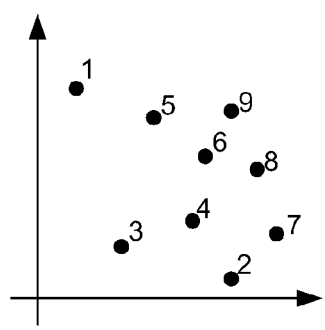

Dominance provides a total ranking of configurations in two steps. First, each configuration is assigned a "rank" equal to the number of solutions that dominate it. By way of example, FIG. 4B shows the Pareto rankings of the two-dimensional vectors shown in the original points of FIG. 4A. This ranking induces a partial order, where each vector with ranking i belongs to an equivalence class $L_i$, and every element in $L_i$ goes before every element in $L_j$ for i<j; (FIG. 4C shows a graphical illustration of such equivalence classes/Pareto layers). A final instance ranking is then obtained by probabilistically choosing a total order consistent with the partial order given by equivalence classes $L_i$; (FIG. 4D shows an example). The pseudo-code below implements this aspect:

```
RankConfigurations (C=c_1, c_2, ..., c_n:configurations)
Output R: a ranked list of configurations
01    for each c_i ∈ C
02        rank(c_i) = |{c_j ∈ C : c_j dominates c_i}|
03    R = [ ]
04    for each i ∈ {1..n}
05        L_i = {c ∈ C : rank(c) = i}
06        LP_i = random permutation of Li
06        append LP_i to R
07    return R
```

One exemplified search strategy relies on the ability to rank configurations at two specific points. A first step picks the transformation that results in the most promising configuration. Second, after pruning the current configuration, the most promising one among the partially explored configurations to which to backtrack is picked. To rank a set of configurations, the process evaluates (or approximates) the values of all the c-objectives as described above. Using code such as the above pseudo-code provides a partial order and probabilistically chooses a ranking consistent with this partial order.

Pruning a given configuration is described above in a manner that relied on identifying when future transformations were not able to improve the current configuration. To extend this technique to work with multiple, rich constraints, a function D is used, which takes a configuration and the left-hand-side function F of an ASSERT clause, and returns one of four possible values (which intuitively represent the "direction" on which F moves after applying transformations to the input configuration). Thus, D::configuration×function→{↑, ↓, ↔,?}

Recall that, for any given configuration instance $C_0$, the framework evaluates the value $F(C_0)$ by binding the free variable C in F (i.e., the desired configuration on top of which constraints are defined) with $C_0$. The semantics of D(C, F) are as follows:

$$D(C, F) = \begin{cases} \uparrow & \text{if } F(C') \geq F(C) \text{ for all } C' \in \text{closure}(C) \\ \downarrow & \text{if } F(C') \leq F(C) \text{ for all } C' \in \text{closure}(C) \\ \leftrightarrow & \text{if } F(C') = F(C) \text{ for all } C' \in \text{closure}(C) \\ ? & \text{otherwise} \end{cases}$$

As an example, consider the following constraint:
ASSERT size(C)−size(COrig)≦200M In this situation, D(C, F)=↓ for any C because any sequence of transformations starting with C will result in a smaller configuration, and therefore the value of function F decreases. Although the definition of D is precise, in practice it might be unfeasible to evaluate D for arbitrary values of F. A best effort policy is adopted, to try to infer D values. If it cannot be proven that D(C, F) ∈ {↑, ↓, ↔}, the unknown value "?" is returned. Operationally, D is evaluated in an inductive manner, by assigning D values for the base numeric function calls, such as, for instance:

D(C, size(C)) = ↓
D(C, size(Tables["R"])) = ↔
D(C, cost(Q, C)) = if type(Q) is SELECT then ↑ else ?

and propagating results through operators using standard rules, such as for instance (i) ↑+↑=↑; (ii) ↑+↓=?; and (iii) max(↑,↔)=↑. (Constraints with generators and aggregation are handled similarly.) Using the definition of D, the following table specifies sufficient conditions to prune the current configuration for a given hard constraint.

| Constraint template | Instance | D(C, F) |
|---|---|---|
| F ≦ K, F ≠ K | F(C) > K | ↑ or ↔ |
| F ≧ K, F ≠ K | F(C) < K | ↓ or ↔ |

Consider the constraint below:

ASSERT cost(W[1], C)/cost(W, COrig)≦0.1

Figure 5:
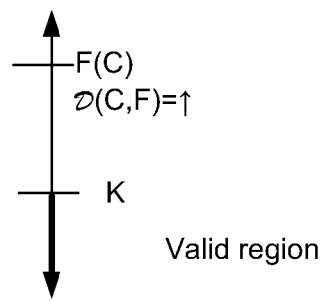
FIG. 5 is a representation a sample pruning condition being met.

In this case, D(C, F)=↑ if W[1] is a SELECT query. The reason is that D(C, cost(W[1], C))=↑, D(C, cost(W, COrig))=↔, and ↑, ↔=↑. If, during the search procedure, the current configuration C satisfies F(C)>0.1 (i.e., C violates the constraint), no element in closure(C) obtained by transforming C is feasible, because values of F(C') are larger than F(C) for any C' transformed from C. Therefore, pruning C is safe, as generally set forth in FIG. 5; in FIG. 5, the constraint is:

F≦K, F(C)>K and D(C, F)=↑, resulting in pruning.

In addition to the conditions set forth in the above table, pruning a configuration C based on a soft constraint additionally requires that C satisfy the hard constraints (because any value of the c-objective associated with the soft constraint is acceptable, overall valid solutions may otherwise be missed).

Although the above technique safely prunes configurations guaranteed to be invalid, there are certain situations which require additional support. For example, consider minimizing the cost of a workload with updates using the constraint below:

SOFT ASSERT cost(W, C)≦0

Because the workload has updates, D(C, cost(W,C))=?. However, suppose that the initial configuration does not contain any index on table R, and all updates queries refer exclusively to table R. In this situation, the cost of the workload increases as transformations are applied, but the system cannot infer it. To address such scenarios, the constraint language is augmented with annotations that override the default pruning behavior. Specifically, adding the keyword "MONOTONIC_UP" (or correspondingly MONOTONIC_DOWN) before the ASSERT clause specifies that the respective constraint function F satisfies D(C, F)=↑ (respectively D(C, F)=↓). The framework has no way to verify whether the annotation is correct and implicitly trusts the annotation as being correct. The example above can then be augmented as follows:

SOFT MONOTONIC_UP ASSERT cost(W,C)≦0

To allow for additional flexibility in defining the search strategy, annotations that heuristically restrict the search space are provided. These annotations result in a tradeoff between search space coverage and the efficiency of the search procedure, and are interesting when at least one constraint satisfies D(C, F)=?. Recall that one search strategy keeps applying transformation rules to the current configuration with the objective to obtain the best configuration that satisfies all constraints. Since c-objectives are usually conflicting, a configuration that improves some objectives may move away from others. However, if the transformed configuration does not improve any objective, there may not be an incentive to continue exploring beyond that point (note that this is a heuristic and as such it might prune valid solutions). Instead, the configuration an may be considered an endpoint, to backtrack to a previously-seen configuration.

This pruning condition can be expressed using the notion of dominance. Suppose that the current configuration, C was obtained by using some transformation over configuration $C_p$. Then, whenever $C_p$ dominates C, the framework prunes C and backtracks. Such heuristic pruning is by accomplished by annotating the global constraint specification with the value USE_DOMINANCE_PRUNING. To provide even additional flexibility into the search strategy, two annotations modify how pruning is handled for individual constraints that satisfy D(C, F)=?. More particularly, the following behaviors are specified:

HILL_CLIMB: If a constraint is marked as HILL_CLIMB, any transformation from $C_p$ to C that results in a value of the constraint in C that is worse than that of $C_p$ gets pruned, even though $C_p$ does not dominate C.

KEEP_VALID: Values of a constraint marked as KEEP_VALID can go up or down from $C_p$ to C. However, if $C_p$ satisfies the constraint and C does not, C is pruned.

Consider wanting an existing index goodI to appear in the final configuration. This can be achieved by using a constraint:

FOR I in C WHERE name(I)="goodI" ASSERT count(I)=1

Because this is a common situation, an alternative and more direct approach is provided to achieve the same goal:

AVOID delete(I) WHERE name(I)="goodI"

mechanically ignores any transformation that matches the specification above. In general the syntax of such specification is:

AVOID transformations [WHERE predicate]

As another example, to avoid merging large indexes, the following fragment may be used:

AVOID merge(*I*1,*I*2) WHERE size(*I*1)≧100*M* OR size(*I*2)≧100*M*

Returning to the example of FIG. 1, general steps are described to go from a problem specification 102 to a SQL script that deploys the resulting physical design. Further, this may be enhanced with extensions that enable additional flexibility and performance. In one example implementation, a full specification 102 contains a header, which includes database and workload information (e.g., the location to find the DBMS and the workload), and a main body, which includes the initial configuration and all the constraints described above. A compiler consumes the specification 102 and produces the two C++ files 104 and 106, one of which comprises a mechanism to initialize the search framework and perform the optimization, and the other of which specifies each of the constraints by using C++ classes, described below. Note that via constraints (e.g., a file) 108, it is possible to directly specify constraints in C++, which provides more flexibility at the expense of simplicity.

After the constraints are translated into C++ classes, the next step compiles this intermediate code and links the result with the search framework 112 (e.g., including a library). This step produces a program that connects to the database system and attempts to solve the constrained optimization problem. Upon completion, the executable returns a SQL script, which can be used to deploy the best configuration, and additional reports that provide details on the configuration to be deployed and the overall search process.

One extensibility mechanism results from using C++ as an intermediate language to specify constraints. In fact, C++ may directly specify constraints that are too complex to be handled inside the constraint language, or constraints that require specific extensions for performance. In the compilation step from the original specification language into C++, each constraint is translated into a class derived from the base Constraint class, which is defined as follows:

```
class Constraint {
protected:
  typedef enum {TNONE, TUP, TDOWN, ...} TPruning;
  virtual TPruning pruning(Conf* conf) {return TNONE;}
  virtual double score(Conf* conf) = 0;
  virtual double estScore(Conf* fromConf, Conf* toConf, Transformation* t);
  ...
}
```

The base Constraint class includes three virtual methods. A first one, pruning, returns the value D(C, F). By default it returns TNONE (i.e., corresponds to D(C,F)=?) and its definition implements the inference mechanism and the heuristic annotations described herein. A second one, score, is called to obtain the value of the c-objective associated with the constraint. It takes a configuration as an input and returns a real number. The result value from score is zero when the constraint is satisfied, and larger than zero otherwise (its magnitude reflects the degree of constraint violation). As can be seen, the simplicity of the constraint language makes the compilation step into derived classes fully mechanical. As an example, consider the following constraint, which enforces that no index is larger than half the size of the underlying table:

```
FOR I in C
ASSERT size(I) ≦ 0.5 * size(table(I))
```

In this example, the generated function is as follows:

```
class C1: public Constraint {
  ...
  double score(Conf* conf) {
    double result = 0;
    for (int i=0; i<conf->numIndexes( ); i++) {
      double f = size( conf[i] );
      double c = 0.5 * size( table(conf[i]) );
      double partialResult = MAX(0.0, f – c);
      result += partialResult;
    }
    return result; }
  ...
};
```

A third function in the base Constraint class, estScore, is called as needed to estimate the c-objective for a given transformation. It takes as inputs the original configuration, the transformation, and the resulting configuration, and returns a real number. There is a default implementation of estScore that mimics the implementation of score working on the transformed configuration. The methods that obtain the cost of the workload under a given configuration are automatically replaced in estScore with those that exploit local transformations from the original configuration, and therefore the default implementation is very efficient. The default implementation estScore may be replaced with a customized version that further improves efficiency. Consider again the storage constraint:

```
FOR I in C
ASSERT sum( size(I) ) ≦ 200M
``` and suppose that the transformation merges $I_1$ and $I_2$ into $I_3$. Using the following equality:

$$\sum_{I \in toConf} size(I) = size(I_3) - size(I_1) - size(I_2) + \sum_{I \in fromConf} size(I)$$

the size of the transformed configuration may be computed in constant time, provided that the size of the original configuration is available. Note that all transformations follow the same general pattern, i.e., $C_{after} = C_{before} \cup I^+ \text{-} I^-$, where $I^+$ and $I^-$ are sets of indexes. Therefore, in many situations ASSERT functions may be incrementally evaluated by reusing previously computed values.

Exemplary Operating Environment

Figure 6:
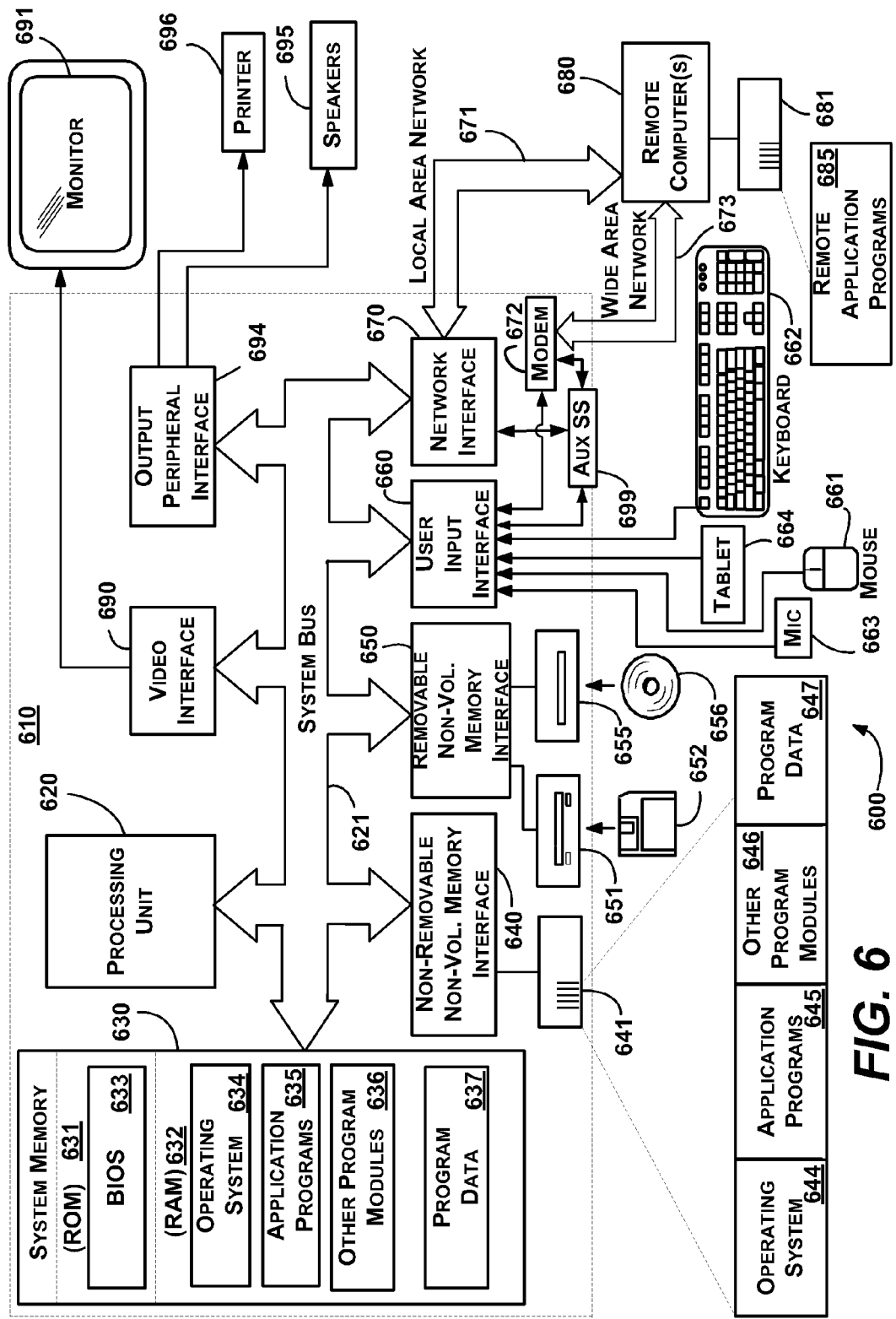
FIG. 6 shows an illustrative example of a computing environment into which various aspects of the present invention may be incorporated.

FIG. 6 illustrates an example of a suitable computing and networking environment 600 into which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing machine in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing machine 610 is incorporated, such as in a tablet-type personal computer. In addition, computers such as the computing machine 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
providing a language to specify a complex constraint that is defined by a grammar expressed as:
constraint:=[SOFT] ASSERT [agg] function ($\leq$I=I$\geq$) constant
I FOR var IN generator
[WHERE predicate]
constraint
where lowercase tokens of the grammar are non-terminals, uppercase tokens of the grammar are literals, tokens of the grammar that are between brackets are optional, 'I' represents choice, the complex constrain is indicated by lowercase token "constraint:=", the optional uppercase token "SOFT" literal indicates a soft assertion of the lowercase token "function" with respect to the lowercase token "constant", the uppercase token "ASSERT" literal represents a start of the complex constraint, the optional lowercase token "agg" non-terminal represents an aggregation, the lowercase token "function" non-terminal represents at least one of a set of functions over various data types, the lowercase token "constant" non-terminal represents a constant term, the uppercase token "FOR" literal indicates applying the lowercase token "constraint" non-terminal over each element of a collection indicated by the lowercase token "generator" non-terminal, the lowercase token "var" non-terminal represents a variable, the uppercase token "IN" literal precedes an identifier that indicates the collection, the optional uppercase token "WHERE" literal indicates a filter that chooses a subset of the lowercase token "generator" non-terminal, the optional lowercase token "predicate" non-terminal that represents a predicate, and the lowercase token "constraint" non-terminal represents a nested complex constraint; and
processing the complex constraint, by a computing device, to determine at least one configuration that meets the constraint for use in physical design tuning of a database.

2. The method of claim 1 wherein the grammar is configured for asserting a function with respect to a value.

3. The method of claim 1 wherein the grammar is configured for specifying generators, filters, aggregates, and nested complex constraints.

4. The method of claim 1 wherein the grammar is configured for asserting a soft assertion of a function with respect to a value.

5. The method of claim 1 wherein processing the complex constraint comprises searching for candidate configurations and selecting a configuration of the candidate configurations for use in physical design tuning.

6. The method of claim 5 wherein the searching for the candidate configurations comprises using transformation rules to generate the candidate configurations from a current configuration.

7. The method of claim 6 wherein the using the transformation rules comprises merging a plurality of indexes in a configuration based on merging rules, replacing one index with another index in a configuration based on reduction rules, or removing an index from a configuration based on deletion rules, or any combination of the merging, replacing, and removing.

8. The method of claim 5 wherein the selecting the selected configuration comprises ranking the candidate configurations.

9. The method of claim 5 wherein the selecting the selected configuration comprises using Pareto optimality.

10. The method of claim 5 wherein the searching for the candidate configurations comprises transforming a configuration until the configuration is pruned, going back to a previous configuration, and transforming the previous configuration.

11. The method of claim 5 wherein the searching for the candidate configurations comprises performing heuristic pruning to restrict the searching.

12. In a computing environment, a system comprising:
a computer; and
a search framework implemented at least in part by the computer and configured for processing a current configuration for use in physical device tuning of a database into candidate configurations, the framework comprising computer-executable instructions that, when executed by the computer, configure the computer for searching for candidate configurations from a current configuration based upon a complex constraint, for iteratively evaluating a search space until a stopping condition is satisfied, for using transformation rules to generate new candidate configurations, and for selecting a best candidate configuration, wherein the complex constraint is defined by the grammar expressed as:

constraint:=[SOFT] ASSERT [agg] function ($\leq$I=I$\geq$) constant
    I FOR var IN generator
    [WHERE predicate]
    constraint where lowercase tokens of the grammar are non-terminals, uppercase tokens of the grammar are literals, tokens of the grammar that are between brackets are optional, 'I' represents choice, the complex constrain is indicated by lowercase token "constraint:=", the optional uppercase token "SOFT" literal indicates a soft assertion of the lowercase token "function" with respect to the lowercase token "constant", the uppercase token "ASSERT" literal represents a start of the complex constraint, the optional lowercase token "agg" non-terminal represents an aggregation, the lowercase token "function" non-terminal represents at least one of a set of functions over various data types, the lowercase token "constant" non-terminal represents a constant term, the uppercase token "FOR" literal indicates applying the lowercase token "constraint" non-terminal over each element of a collection indicated by the lowercase token "generator" non-terminal, the lowercase token "var" non-terminal represents a variable, the uppercase token "IN" literal precedes an identifier that indicates the collection, the optional uppercase token "WHERE" literal indicates a filter that chooses a subset of the lowercase token "generator" non-terminal, the optional lowercase token "predicate" non-terminal that represents a predicate, and the lowercase token "constraint" non-terminal represents a nested complex constraint.

13. The system of claim 12 wherein the iteratively evaluating the search space comprises evaluating and caching the current configuration and performing a pruning check on the current configuration.

14. The system of claim 13 wherein the performing the pruning check comprises determining to prune the current configuration, retrieving another configuration that is not pruned, and using transformation rules to generate new candidate configurations.

15. The system of claim 12 further comprising computer-executable instructions that, when executed by the computer, further configure the computer for ranking the candidate configurations.

16. The system of claim 12 further comprising computer-executable instructions that, when executed by the computer, further configure the computer for stopping a current iterative evaluation based on determining that one configuration dominates other configurations not yet iteratively evaluated.

17. At least one computer storage media storing computer-executable instructions that, when executed by a computer, cause the computer to perform a method comprising processing a complex constraint for use in physical design database tuning, the processing including searching for candidate configurations that meet the complex constraint and selecting at least one configuration from among the candidate configurations, wherein the complex constraint is defined by the grammar expressed as:

constraint:=[SOFT] ASSERT [agg] function ($\leq$I=I$\geq$)
    constant
    I FOR var IN generator
    [WHERE predicate]
    constraint where lowercase tokens of the grammar are non-terminals, uppercase tokens of the grammar are literals, tokens of the grammar that are between brackets are optional, 'I' represents choice, the complex constrain is indicated by lowercase token "constraint:=", the optional uppercase token "SOFT" literal indicates a soft assertion of the lowercase token "function" with respect to the lowercase token "constant", the uppercase token "ASSERT" literal represents a start of the complex constraint, the optional lowercase token "agg" non-terminal represents an aggregation, the lowercase token "function" non-terminal represents at least one of a set of functions over various data types, the lowercase token "constant" non-terminal represents a constant term, the uppercase token "FOR" literal indicates applying the lowercase token "constraint" non-terminal over each element of a collection indicated by the lowercase token "generator" non-terminal, the lowercase token "var" non-terminal represents a variable, the uppercase token "IN" literal precedes an identifier that indicates the collection, the optional uppercase token "WHERE" literal indicates a filter that chooses a subset of the lowercase token "generator" non-terminal, the optional lowercase token "predicate" non-terminal that represents a predicate, and the lowercase token "constraint" non-terminal represents a nested complex constraint.

18. The at least one computer storage media of claim 17 wherein the searching for the candidate configurations comprises merging a plurality of indexes in a configuration based on merging rules, replacing one index with another index in a configuration based on reduction rules, or removing an index from a configuration based on deletion rules, or any combination of the merging, replacing, and removing.

19. The at least one computer storage media of claim 17 wherein the selecting the at least one configuration from among the candidate configurations comprises ranking the candidate configurations.

20. The at least one computer storage media of claim 17 wherein the searching for the candidate configurations comprises transforming a configuration until the configuration is pruned, going back to a previous configuration, and transforming the previous configuration.

* * * * *